3,007,935
CERTAIN PYRIDYL (AMINOALKYLENE OXY)-
PHENYL KETONES
William Laszlo Bencze, Summit, N.J., assignor to Ciba
Pharmaceutical Products, Inc., Summit, N.J., a corporation of New Jersey
No Drawing. Filed Apr. 22, 1959, Ser. No. 808,026
2 Claims. (Cl. 260—296)

The present invention concerns tertiary alcohols and derivatives thereof. More particularly, it relates to compounds of the formula:

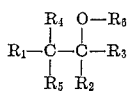

in which at least one of the radicals $R_1$ and $R_2$ represents a heterocyclic aryl radical, and the other a heterocyclic aryl radical or a carbocyclic aryl radical, $R_3$ stands for a monocyclic carbocyclic aryl radical, substituted by a group of the formula —O—A—Z, in which Z represents a tertiary amino group and A a lower alkylene radical, each of the radicals $R_4$ and $R_5$ represents hydrogen or lower alkyl, and $R_6$ hydrogen or acyl, salts and quaternary ammonium compounds, as well as process for the preparation thereof.

A heterocyclic aryl radical $R_1$ or $R_2$ represents a bicyclic, or primarily a monocyclic heterocyclic aryl radical, the hetero atom of which may be sulfur, or particularly nitrogen. One or more hetero atoms, particularly nitrogen atoms, may form part of the heterocyclic nucleus. Preferred are monocyclic heterocyclic aryl radicals, which contain one or two nitrogen atoms as members of the heterocycle. Such radicals are primarily 2-pyridyl, 3-pyridyl or 4-pyridyl radicals; 3-pyridazinyl, 2-pyrimidyl, 4-pyrimidyl or 2-pyrazinyl radicals represent groups with two nitrogen atoms as members of the heterocyclic nucleus. The heterocyclic radical is preferably unsubstituted; possible substituents may be, for example, lower alkyl, e.g. methyl or ethyl, lower alkoxy, e.g. methoxy, or halogen, e.g. chlorine or bromine.

If only one of the radicals $R_1$ and $R_2$ is represented by a heterocyclic aryl radical, the other radical stands for a carbocyclic aryl radical, particularly a monocyclic carbocyclic aryl radical, which may be unsubstituted or substituted by lower alkyl, e.g. methyl or ethyl, lower alkoxy, e.g. methoxy or ethoxy, lower alkylenedioxy, e.g. methylenedioxy, lower alkyl-mercapto, e.g. methylmercapto or ethylmercapto, nitro, amino, such as tertiary amino, for example, di-lower alkyl-amino, e.g. dimethyl-amino, halogen, e.g. fluorine, chlorine or bromine, or polyhalogeno-lower alkyl, e.g. trifluoromethyl.

The monocyclic carbocyclic radical $R_3$ is substituted by a tertiary amino-lower alkoxy group of the formula —O—A—Z, which may be located in any of the available positions, but substitutes preferably the 4-position.

In a tertiary amino-lower alkyl radical of the formula —A—Z the tertiary amino group Z is particularly an N,N-di-lower hydrocarbon-amino, an N,N-lower alkylene-imino, an N,N-lower oxa-alkylene-imino, an N,N-lower thia-alkylene-imino or an N,N-lower aza-alkylene-imino group. Lower hydrocarbon radicals of an N,N-di-lower hydrocarbon-amino group are, for example, lower alkenyl, lower cycloalkyl, carbocyclic aryl, carbocyclic aryl-lower alkyl, or primarily lower alkyl radicals containing from one to seven carbon atoms. Such radicals are, for example, methyl, ethyl, propyl, isopropyl, butyl, isobutyl, pentyl, neopentyl, allyl, methallyl, cyclopentyl, cyclohexyl, phenyl or benzyl. Therefore, N,N-di-lower hydrocarbonamino groups are particularly represented by N,N-di-lower alkyl-amino, e.g. dimethylamino, diethylamino, di-propylamino or diisopropylamino groups, or, in addition, by N-methyl-N-cyclopentylamino or N-methyl-N-benzyl-amino groups. The lower alkylene portion of N,N-lower alkylene-imino, N,N-lower oxa-alkylene-imino, N,N-lower thia-alkylene-imino or N,N-lower aza-alkylene-imino groups contain preferably from four to six carbon atoms. Together with the nitrogen atom such lower alkylene, lower oxa-alkylene, lower thia-alkylene or lower aza-alkylene radicals represent, for example, pyrrolidino radicals, e.g. pyrrolidino or 2-methyl-pyrrolidino, piperidino radicals, e.g. piperidino, 2-methyl-piperidino, 3-methyl-piperidino, 4-methyl-piperidino, 3-hydroxy-piperidino, 3-acetoxy-piperidino or 3-hydroxymethyl-piperidino, hexamethyleneimino, morpholino, thiamorpholino, or piperazino radicals, e.g. 4-methyl-piperazino, 4-hydroxyethyl-piperazino or 4-acetoxyethyl-piperazino.

The lower alkyl portion A of a tertiary amino-lower alkyl radical of the formula —A—Z represents a lower alkylene radical, which contains preferably from two to three carbon atoms and separates the tertiary amino group from the oxygen atom of the tertiary amino-lower alkoxy group of the formula —O—A—Z by at least two carbon atoms. Lower alkylene radicals representing this group A are primarily 1,2-ethylene, 1-methyl-1,2-ethylene, 2-methyl-1,2-ethylene or 1,3-propylene.

In addition to the substituent —O—A—Z the monocyclic carbocyclic aryl group $R_3$ may contain other substituents, such as, for example, lower alkyl, e.g. methyl or ethyl, lower alkoxy, e.g. methoxy or ethoxy, lower alkylenedioxy, e.g. methylenedioxy, lower alkyl-mercapto, e.g. methylmercapto or ethylmercapto, nitro, amino, such as tertiary amino, for example, di-lower alkyl-amino, e.g. dimethylamino, halogen, e.g. fluorine, chlorine or bromine, or polyhalogeno-lower alkyl, e.g. trifluoromethyl.

The radicals $R_4$, $R_5$ and $R_6$ represent primarily hydrogen. $R_4$ and $R_5$, when representing lower alkyl, may be particularly methyl. $R_6$ may also stand for an acyl group. Such acyl group represents especially the acyl radical of a lower aliphatic carboxylic acid, such as a lower alkanoic acid, e.g. acetic, propionic, butyric or pivalic acid. Also anticipated are acyl radicals of lower alkyl carbonic acids, e.g. ethyl carbonic acid, lower alkenoic acids, e.g. acrylic or methacrylic acid, or lower alkinoic acids, e.g. propiolic acid; these lower aliphatic carboxylic acids may contain additional substituents, such as, for example, lower alkoxy, e.g. methoxy or ethoxy, halogen, e.g. fluorine, chlorine or bromine, or N,N-di-lower alkyl-amino, e.g. dimethylamino or diethylamino. Other acyl groups may be those of carbocyclic aryl carboxylic acids, such as monocyclic or bicyclic carbocyclic aryl carboxylic acids, e.g. benzoic or naphthoic acid, which may contain as additional substituents lower alkyl, e.g. methyl or ethyl, lower alkoxy, e.g. methoxy or ethoxy, lower alkylenedioxy, e.g. methylenedioxy, lower alkyl-mercapto, e.g. methylmercapto or ethylmercapto, nitro, amino, such as tertiary amino, for example, di-lower alkyl-amino, e.g. dimethylamino, or halogen, e.g. fluorine, chlorine or bromine. Furthermore, acyl radicals of heterocyclic aryl carboxylic acids, such as monocyclic heterocyclic aryl carboxylic acids, e.g. nicotinic, isonicotinic, furoic or thienoic acid, may also be represented by $R_6$.

Salts of the compounds of this invention are particularly therapeutically acceptable acid addition salts with inorganic acids, particularly mineral acids, such as hydrohalic acids, e.g. hydrochloric or hydrobromic acid, sulfuric or phosphoric acids, or with organic acids, for example, carboxylic acids, such as acetic, propionic, glycolic, lactic, pyruvic, succinic, maleic, hydroxymaleic, dihydroxymaleic, fumaric, malic, tartaric, citric, benzoic, cinnamic, mandelic or salicylic acid, or organic sulfonic acids, e.g. methane sulfonic, ethane sulfonic of hydroxyethane sulfonic acid. Mono- or poly-salts may be formed, depending on the procedure used for the preparation of the salts and the number of salt forming groups present in the molecule.

Quaternary ammonium derivatives of the compounds of this invention are particularly those with reactive esters formed by aliphatic hydroxy-compounds with strong acids; such acids are particularly mineral acids, such as hydrohalic acids, e.g. hydrochloric, hydrobromic or hydriodic acids, or organic sulfonic acids, such as lower alkane sulfonic acids, e.g. methane or ethane sulfonic acid or lower hydroxy-alkane sulfonic acid, e.g. 2-hydroxy-ethane sulfonic acid. Such esters are especially lower alkyl halides, e.g. methyl, ethyl, propyl or isopropyl chloride, bromide or iodide, lower alkyl lower alkane sulfonates, e.g. methyl or ethyl methane or ethane sulfonate, or lower alkyl hydroxy-lower alkane sulfonates, e.g. methyl 2-hydroxyethane sulfonate. Also included as quaternary ammonium compounds are the quaternary ammonium hydroxides, and the salts of such quaternary ammonium hydroxides with inorganic, or particularly with organic carboxylic or sulfonic acids, such as with those described hereinbefore as being suitable for the preparation of acid addition salts. Mono- or poly-quaternary ammonium compounds may be formed, depending on the reaction conditions used and the number of tertiary amino groups present in the molecule.

Due to the presence of an asymmetric carbon atom, the compounds of the invention may be obtained in the form of a racemate, and compounds with more than one asymmetric carbon atom may form fixtures of racemates. The latter may be separated into the single racemates, which may be resolved into the antipodes as shown hereinbelow.

The compounds of the present invention exhibit anti-uterotropic or anti-estrogenic effects. They may, therefore, be used, for example, as anti-fertility agents to prevent the fertilization of the ovum. They may also beneficially influence so-called collagen diseases, such as gout, lupus erythromatosis, Still's disease, osteoporosis or related conditions.

In addition, the compounds of this invention affect the relative distribution of cholesterol in the body and may, therefore, be used in the treatment of arteriosclerosis, atherosclerosis and similar conditions.

Particularly useful are compounds of the formula:

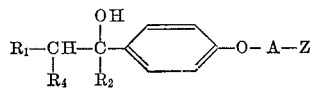

in which at least one of the radicals $R_1$ and $R_2$ represents a pyridyl radical, and the other stands for a pyridyl radical or a monocyclic carbocyclic aryl radical, which may be unsubstituted or substituted by lower alkyl, e.g. methyl, lower alkoxy, e.g. methoxy, or halogen, e.g. chlorine or bromine, $R_4$ stands for hydrogen or methyl, A represents a lower alkylene radical, having from two to three carbon atoms and separating the tertiary amino group Z from the oxygen atom by at least two carbon atoms, and Z stands for N,N-di-lower alkyl-amino, in which lower alkyl has from one to four carbon atoms, or N,N-lower alkylene-imino, N,N-lower oxa-alkylene-imino or N,N-lower aza-alkylene imino, the alkylene radicals of which contain from four to six carbon atoms, and acid addition salts with mineral acids or aliphatic monocarboxylic or dicarboxylic acids. This series of compounds may be illustrated by the following groups of compounds having the formulae:

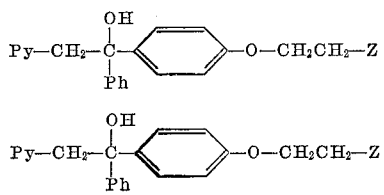

or

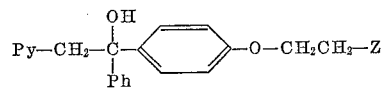

in which formulae Py represents pyridyl, Ph stands for phenyl, methyl-phenyl, methoxy-phenyl, chloro-phenyl or bromo-phenyl, and Z stands for N,N-di-lower alkyl-amino, in which lower alkyl contains from one to four carbon atoms, and acid addition salts with mineral acids, lower alkane carboxylic acids, lower alkene dicarboxylic acids or lower hydroxy-alkane dicarboxylic acids.

The compounds of this invention may be used as medicaments in the form of pharmaceutical preparations, which contain the new derivatives or salts thereof in admixture with a pharmaceutical organic or inorganic, solid or liquid carrier suitable for enteral, e.g. oral, or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in the solid form, for example, as capsules, tablets or dragees, or in liquid form, for example, as solutions, suspensions or emulsions. If desired, they may contain auxiliary substances, such as preserving agents, stabilizing agents, wetting or emulsifying agents, salts for varying the osmotic pressure or buffers. They may also contain in combination, other therapeutically useful substances.

The compounds of this invention may be obtained by reacting a ketone of the formula:

in which $R_2$ and $R_3$ have the previously given meaning, with a reagent of the formula:

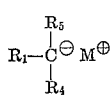

in which $R_1$, $R_4$ and $R_5$ have the previously given meaning, and $M^\oplus$ represents the positive ion of certain metals of the IA-group of the periodic system or the positive ion of a mono-halide of certain divalent metals of the IIA-group and the IIB-group of the periodic system, and, if desired, acylating a resulting tertiary hydroxyl group, and/or, converting a resulting salt into the free base, and/or, if desired, converting a free base into a salt or a quaternary ammonium compound thereof, and/or, separating a resulting mixture of racemates of compounds having more than one asymmetric carbon atom into the single racemates, and/or, resolving a resulting racemate into the antipodes.

In the above-mentioned reagent of the formula:

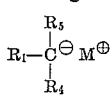

$M^\oplus$ represents primarily the positive ion of an alkali metal, such as sodium, or particularly lithium, or the positive ion of a mono-halide of magnesium. Alkali metal derivatives are preferably used with those compounds, in which $R_1$ represents a heterocyclic aryl radical, and each of the radicals $R_4$ and $R_5$ represents hydrogen or lower alkyl, or in which $R_1$ stands for a carbocyclic aryl radical and at least one of the radicals $R_4$ and $R_5$ represents lower alkyl, whereas the magnesium halide-type reagent (Grignard reagent) is especially useful with compounds, in which $R_1$ stands for a carbocyclic aryl radical and both radicals $R_4$ and $R_5$ represent hydrogen.

Both types of reagents are used under similar conditions; preferably, the alkali metal compound or the Grignard reagent is prepared separately and is then reacted with the ketone. The solvent present during the preparation of the reagent, primarily diethyl ether, may also be used in the condensation reaction or may be diluted or replaced by other suitable solvents, for example, other ethers, such as monocyclic carbocyclic aryl lower alkyl ethers, e.g. anisole, bis-monocyclic carbocyclic aryl ethers, e.g. diphenyl ether, cyclic ethers, e.g. tetrahydrofuran or p-dioxane, organic bases, e.g. pyridine or N-methyl-morpholine, monocyclic carbocyclic aryl hydrocarbons, e.g. benzene or toluene, or aliphatic hydrocarbons, e.g. pentane or hexane. The reaction may be carried out and completed under cooling, at room temperature, or while heating, and, if desired, the atmosphere of an inert gas, e.g. nitrogen, may be required, particularly when alkali metal reagents are used.

The resulting reaction mixture may be worked up according to known methods. For example, a complex resulting from the reaction of a ketone with a Grignard reagent may be broken, for example, by adding a weak acid, such as an aqueous solution of ammonium chloride to the reaction mixture. The desired product may be isolated by extraction, absorption and elution, crystallization, etc. and purified by recrystallization, salt formation, etc.

The starting materials used in the above reaction may be known or may be prepared according to methods used for the preparation of known analogs.

For example, reagents of the formula:

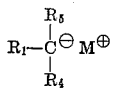

in which $R_4$ and $R_5$ have the previously given meaning, $R_1$ represents a heterocyclic aryl radical and $M^{\oplus}$ stands for the positive ion of an alkali metal, particularly a lithium ion, may be prepared by reacting the compound of the formula:

with an organic alkali metal compound, such as, for example, phenyl sodium, phenyl lithium or n-butyl lithium, preferably in the presence of an inert solvent, such as an ether, e.g. diethyl ether, and in the atmosphere of an inert gas, e.g. nitrogen. Similarly, reagents of the formula:

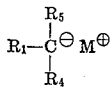

in which $R_1$ represents a carbocyclic aryl radical, at least one of the radicals $R_4$ and $R_5$ stands for lower alkyl and $M^{\oplus}$ represents the positive ion of an alkali metal, especially a lithium ion, may be obtained by treating with lithium and at temperatures below 0° C. a dilute solution of an ether of the formula:

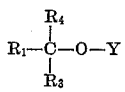

in which Y may stand for lower alkyl, e.g. methyl, carbocyclic aryl, e.g. phenyl, or carbocyclic aryl-lower alkyl, e.g. the radical of the formula:

in which $R_1$, $R_4$ and $R_5$ have the above-given meaning, in an inert solvent, especially an ether, e.g. tetrahydrofurane. This latter procedure may also be used for the manufacture of alkali metal reagents of the formula:

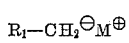

in which $R_1$ represents a carbocyclic aryl radical and $M^{\oplus}$ stands for the positive ion of an alkali metal.

However, for the introduction of a carbocyclic arylmethyl radical the use of a Grignard reagent of the formula:

in which $R_1$ stands for carbocyclic aryl and $M^{\oplus}$ represents the positive ion of a mono-halide of certain metals of groups IIA and IIB of the periodic system, particularly of magnesium, may be more appropriate. Such reagents are obtained according to known methods.

Furthermore, certain ketones used as intermediates in the reaction of the invention, particularly those of the formula:

in which $R_3$ has the previously given meaning and $R_2$ represents a carbocyclic aryl radical, are known. Others, especially those, in which $R_2$ represents a heterocyclic radical, and salts thereof are new and are intended to be included within the scope of the invention. Primarily anticipated are ketones of the formula:

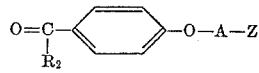

in which $R_2$ represents a pyridyl radical, A stands for lower alkylene having from two to three carbon atoms and separating the group Z from the oxygen by at least two carbon atoms, and Z stands for N,N-di-lower alkylamino, in which lower alkyl contains from one to four carbon atoms, or N,N-lower alkylene-imino, N,N-lower oxa-alkylene-imino or N,N-lower aza-alkylene-imino, the alkylene radicals of which contain from four to six carbon atoms, and acid addition salts thereof. This series of intermediates may be illustrated by the ketones of the formula:

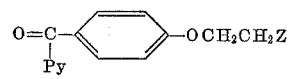

in which Py stands for a pyridyl radical and Z represents an N,N-di-lower alkyl-amino group, in which lower alkyl contains from one to four carbon atoms, and acid addition salts thereof.

The new intermediates may be prepared according to methods used for analogous compounds. For example, ketones of the formula:

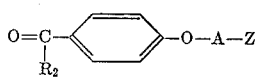

in which $R_2$ represents a pyridyl radical, A stands for a lower alkylene radical containing from two to three carbon atoms and separating the group Z from the oxygen by at least two carbon atoms, and Z represents N,N-di-lower alkyl-amino, in which lower alkyl contains from one to four carbon atoms, or N,N-lower alkylene-imino, N,N-lower oxa-alkylene-imino or N,N-lower aza-alkylene-imino, in which the lower alkylene radical contains from four to six carbon atoms, and salts thereof, may be prepared by treating an ester of the formula:

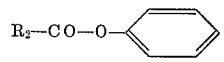

in which $R_2$ represents a pyridyl radical, with a strong inorganic Lewis acid, and reacting the resulting phenolic ketone of the formula:

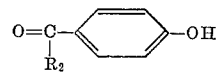

said phenolic ketone being preferably in the form of an alkali metal salt thereof, with a halide of the formula:

in which A and Z have the previously given meaning and Hal represents a halogen atom, particularly chlorine, and, if desired, converting a resulting salt into the free base, and/or, if desired, converting a free base into a salt thereof.

The rearrangement of the carboxylic acid ester to the phenolic ketone in the presence of a strong inorganic Lewis acid may be carried out according to the procedure known as the Fries Rearrangement (A. H. Blatt, Organic Reactions, vol. I, p. 342, 1942, Wiley, New York). The strong inorganic Lewis acid is primarily a halide of a polyvalent metal, particularly aluminum chloride, aluminum bromide or stannic chloride; suitable solvents, if necessary, are, for example, carbon disulfide, nitrobenzene, or analogous inert solvents.

The conversion of the phenolic ketone into the starting material is preferably carried out by forming the alkali metal salt of the phenolic ketone, for example, by treatment with an alkali metal hydride, e.g. sodium hydride, or an alkali metal amide, e.g. sodium amide, in a solvent, such as, for example, p-dioxane or analogous inert solvents suitable for the preparation of such metal derivatives. The resulting salt is then reacted with the halide of the formula:

Hal—A—Z in which A, Z and Hal have the above-given meaning, in an inert solvent, such as, for example, in those used for the preparation of the salt.

A modification of the procedure for the preparation of the compounds of this invention, particularly those of the formula:

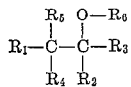

in which $R_1$ represents a heterocyclic aryl radical and $R_2$ stands for a carbocyclic aryl radical and $R_3$, $R_4$, $R_5$ and $R_6$ have the previously outlined meaning, comprises reacting a ketone of the formula:

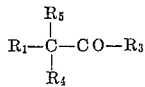

in which $R_1$ has the above-given meaning, but represents primarily a heterocyclic aryl radical and $R_3$, $R_4$ and $R_5$ have the above-given meaning, with a reagent of the formula:

$$R_2^{\ominus} M^{\oplus}$$

in which $R_2$ may have the previously given meaning, but represents primarily a carbocyclic aryl radical, and $M^{\oplus}$ stands for the positive ion of certain alkali metals (group IA of the periodic system) or, more especially, the positive ion of a mono-halide of certain metals of groups IIA and IIB of the periodic system, particularly of a mono-halide of magnesium, and, if desired, carrying out the optional steps.

Although certain heterocyclic compounds form alkali metal or Grignard reagents, such as, for example, 2-pyridyl magnesium chloride or 3-pyridyl magnesium bromide, carbocyclic aryl reagents are advantageously used as reagents in the above modification of the general procedure. These reagents are prepared according to known methods, such as those previously described.

The ketones used as intermediates in the above modification are known, or, if new, may be prepared according to known procedures. For example, ketones of the formula:

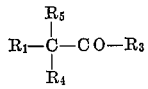

in which $R_1$ represents a heterocyclic aryl radical and $R_3$, $R_4$ and $R_5$ have the previously given meaning, may be prepared by reacting a reagent of the formula:

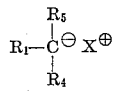

in which $R_1$, $R_4$ and $R_5$ have the above given meaning and $M^{\oplus}$ represents the positive ion of an alkali metal, such as sodium, or particularly lithium, with the ester of an acid of the formula:

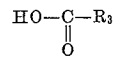

in which $R_3$ has the previously given meaning, with a lower alkanol, e.g. methanol or ethanol. The reaction is carried out under known conditions, which are in general analogous to those employed in reactions involving organic metal reagents, as, for example, described hereinbefore.

If desired, the resulting tertiary alcohols may be converted into the corresponding acyloxy groups. For example, the reactive functional derivative of a carboxylic acid is reacted with the tertiary alcohol in the presence of an organic base, for example, a tertiary amine, such as a tri-lower alkyl-amine, e.g. trimethyl-amine, N,N-dimethyl-N-ethyl-amine, N,N-diethyl-N-methyl-amine, triethyl-amine, or N-benzyl-N,N-dimethyl-amine, dimethyl-aniline, etc. or a heterocyclic base, e.g. pyridine, collidine or lutidine, or in the presence of an inorganic basic salt, such as an alkali metal or alkaline earth metal carbonate, e.g. sodium carbonate, potassium hydrogen carbonate or calcium carbonate. The liquid bases may serve as solvents as well, or other solvents, which are primarily used with the solid bases, may be added, such as, for example, aromatic hydrocarbons, e.g. benzene, toluene or xylene, aliphatic hydrocarbons, e.g. pentane or hexane, or ethers, e.g. diethyl ether. Reactive functional derivatives of the acids are primarily acid anhydrides and acid halides, e.g. chlorides or bromides, which reagents are preferably used in the presence of a tertiary amine, or particularly a heterocyclic base, e.g. pyridine.

The esterification may also be accomplished by treating the alcohol with the anhydride of a carboxylic acid in the presence of an acid instead of the base; for example, sulfuric acid or perchloric acid may be utilized, preferably in catalytic amounts.

Additional esterification reagents are, for example, ketenes, such as ketene or substituted ketenes, which furnish an acetyl or substituted acetyl radicals. Such reaction is performed in an inert solvent, such as an aromatic hydrocarbon, e.g. toluene.

The acylation reaction may be performed under cooling, at room temperature or, though less frequently, at an elevated temperature. If necessary, the atmosphere of an inert gas, e.g. nitrogen may be required.

The compounds of this invention may be obtained in the form of free bases or as the salts thereof. A salt may be converted into the free base, for example, by reaction with an alkaline reagent, such as, for example, aqueous alkali metal hydroxide, e.g. lithium, sodium or potassium hydroxide, aqueous alkali metal carbonate, e.g. sodium or potassium carbonate or hydrogen carbonate, or aqueous ammonia. A free base may be converted into its acid addition salts by reacting the former with one of the inorganic or organic acids mentioned hereinbefore, for example, by treating a solution of the free base in a solvent, such as a lower alkanol, e.g. methanol, ethanol, propanol or isopropanol, an ether, e.g. diethylether, or a mixture of such solvents with the acid or a solution thereof. The salts may also be obtained as the hemihydrates, monohydrates, sesquihydrates or polyhydrates depending on the conditions of salt formation; mono- or poly-salts may be found depending on the number of salt-forming groups and/or conditions of salt formation.

The quaternary ammonium derivatives of the compounds of this invention may be obtained, for example, by reacting the tertiary base with an ester formed by a hydroxylated aliphatic hydrocarbon compound and a strong inorganic or organic acid. Hydroxylated aliphatic hydrocarbon compounds may contain from one to seven carbon atoms, and esters thereof are more especially those with strong mineral acids. Such esters are specifically lower alkyl halides, e.g. methyl, ethyl, propyl or isopropyl chloride, bromide, iodide, lower alkyl lower alkane sulfonates, e.g. methyl or ethyl methane or ethane sulfonate, or lower alkyl lower hydroxy-alkane sulfonates, e.g. methyl 2-hydroxyethane sulfonate. The quaternizing reactions may be performed in the presence of a solvent; suitable solvents are more especially lower alkanols, e.g. methanol, ethanol, propanol, isopropanol, butanol or pentanol, lower alkanones, e.g. acetone or methyl ethyl ketone, or organic acid amides, e.g. formamide or dimethylformamide. If necessary, elevated temperature, pressure and/or the atmosphere of an inert gas, e.g. nitrogen, may be required.

Resulting quaternary ammonium compounds may be converted into the corresponding quaternary ammonium hydroxides, for example, by reacting a quaternary ammonium halide with silver oxide, or a quaternary ammonium sulfate with barium hydroxide, by treating a quaternary ammonium salt with an anion exchanger, or by electrodialysis. From a resulting quaternary ammonium hydroxide there may be prepared therapeutically acceptable quaternary ammonium salts by reacting the former with acids, for example, with those outlined hereinbefore for the preparation of the acid addition salts. A quaternary ammonium compound may also be converted directly into another quaternary ammonium salt without the formation of a quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also crystallize as hydrates; mono- or poly-quaternary ammonium compounds may be formed depending on the number of tertiary amino groups present and/or the conditions of the quaternizing reaction.

Resulting racemates of the compounds of this invention may be resolved into optically active d- and l-forms according to procedures known for the resolution of racemic compounds. Thus, to a solution of the free base of a racemic d,l-compound, for example, in a lower alkanol, e.g. methanol or ethanol, may be added one of the optically active forms of an acid containing an asymmetric carbon atom, if desired, in solution, for example, in the same lower alkanol or in water or in a mixture of such solvents, whereupon a salt may be isolated, which is formed by the optically active acid with one of the optically active forms of the base. Especially useful as optically active forms of salt forming acids having an asymmetric carbon atom are D- and L-tartaric acid and D-dibenzoyl-tartaric acid; the optically active forms of malic, mandelic, camphor sulfonic or quinic acid may also be employed. From a resulting salt, the free and optically active base may be obtained according to processes used for the conversion of a salt into a base, for example, as outlined hereinbefore. An optically active base may be converted into a therapeutically useful acid addition salt with one of the acids mentioned hereinbefore, or may be converted into a quaternary ammonium compound. The optically active forms may also be isolated by biochemical methods.

Compounds of this invention containing more than one symmetric carbon atom may be obtained as mixtures of racemic compounds or salts thereof, which may be separated into the individual racemic compounds or salts thereof on the basis of physico-chemical differences, such as solubility, for example, by fractionated crystallization. Single racemates may be separated into the antipodes as shown hereinbefore.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

11.2 g. of a solution of n-butyl lithium in hexane, containing 1.768 g. of butyl lithium (0.158 g. of butyl lithium in 1 ml. of hexane), is kept under a nitrogen atmosphere and cooled in an ice-bath. 2.57 g. of $\alpha$-picoline in 20 ml. of benzene is added; the red solution is stirred for three hours at room temperature.

A solution of 4.52 g. of 4-(2-diethylaminoethoxy)-4'-methoxy-benzophenone in 25 ml. of benzene is slowly given to the picoline lithium reagent; the mixture is stirred for three hours at room temperature and then allowed to stand overnight. The dark green solution is poured onto ice, the organic layer is separated and the aqueous phase is extracted three times with ether. The organic solutions are combined, washed with concentrated aqueous sodium chloride and dried over sodium sulfate. The solvents are removed to yield an orange oil. 1 g. of said oil, dissolved in a 1:1-mixture of hexane and benzene, is chromatographed on an absorption column containing neutral aluminum oxide (activity III according to Brockmann) prewashed with hexane. A small amount of $\alpha$-picoline is removed with the 1:1 mixture of hexane and benzene; a yellow oil, representing the 1-[4-(2-diethylaminoethoxy)-phenyl]-1-(4-methoxy-phenyl)-2-(2-pyridyl-ethanol is eluted with benzene. The IR-absorption spectrum reveals the absence of a carbonyl band at 1680 cm.$^{-1}$, and has the characteristic hydroxyl band at 3280 cm.$^{-1}$, pyridyl band at 765 cm.$^{-1}$ and disubstituted phenyl band at 830 cm.$^{-1}$.

The oily product may be converted into the citrate or the maleate by adding citric acid or maleic acid, respectively, to an ethanol solution of the free base.

By substituting $\gamma$-picoline or 2-ethyl-pyridine for the $\alpha$-picoline and proceeding as outlined in the above procedure the 1-[4-(2-diethylaminoethoxy)-phenyl]-1-(4-methoxy-phenyl)-2-(4-pyridyl)-ethanol and the 1-[4-(2-diethylaminoethoxy)-phenyl]-1-(4-methoxy-phenyl)-2-(2-pyridyl)-propanol, respectively, can be prepared.

The starting material may be prepared as follows: A solution of 38 g. of aluminum chloride in 85 ml. of nitrobenzene may be obtained by heating a mixture thereof to 100°, which is then cooled to 0°. 32.5 g. of phenyl 4-methoxy-benzoate is added at once and the reaction mixture is stirred for one hour at 80°. The nitrobenzene is removed by steam distillation, the residue is diluted with a 1:1 mixture of concentrated aqueous hydrochloric acid and water, and the acidic phase is extracted three times with ethyl acetate. The organic extract is washed with concentrated aqueous sodium chloride, threated with activated charcoal and dried over sodium sulfate. The solvent is removed under reduced pressure, a 1:1 mixture of ether and pentane is added, and the crystalline material is filtered off. An additional crop is obtained from the mother liquors; the combined crops are recrystallized twice from aqueous ethanol to yield the 4-hydroxy-4'-methoxy-benzophenone, M.P. 153–154°; yield: 6.8 g.

To a solution of 6.8 g. of 4-hydroxy-4'-methoxy-benzophenone in 90 ml. of toluene is added portionwise 1.42 g. of sodium hydride (52 percent pure) while stirring at room temperature. 28.8 ml. of a toluene solution of 2- dimethylaminoethyl chloride, containing 4.03 g. of the base (0.14 g. of the base in 1 ml. of toluene), is added; the reaction mixture is refluxed for three hours, then allowed to stand overnight. The solid material is removed by filtration, is washed with toluene and then discarded. The solvent is removed from the filtrate, ether is added and dry hydrogen chloride gas is passed through the solution. The oily precipitate is filtered off, crystallized from a 1:1-mixture of acetone and ether and recrystallized from ethyl acetate to yield the 4-(2-diethylaminoethoxy)-4'-methoxy-benzophenone hydrochloride, M.P. 139–140°, yield: 5.2 g.

The hydrochloride salt is dissolved in a minimum amount of water, 2 N aqueous sodium carbonate is added until the solution reacts neutral, and the organic material is then extracted with ether. The organic layer is washed with aqueous sodium chloride and dried over sodium sulfate, the solvent is evaporated and the 4-(2-diethylaminoethoxy)-4'-methoxy-benzophenone is distilled under reduced pressure. It solidifies and melts at 56–60°; yield: 4.52 g.

*Example 2*

A solution of 4-chloro-benzyl magnesium chloride in diethyl ether may be treated with 4-(2-dimethylaminoethoxy)-phenyl 3-pyridyl ketone according to the procedure shown in Example 1; the resulting 2-(4-chlorophenyl) - 1 - [4 - (2-dimethylaminoethoxy)-phenyl]-1-(3 - pyridyl)-ethanol may be converted to the maleate by treatment of an ethanol solution of the free base with maleic acid.

The starting material may be obtained by treating phenyl nicotinate with aluminum chloride in nitrobenzene according to the conditions of the Fries rearrangement. The resulting 4-hydroxy-phenyl 3-pyridyl ketone is etherified to the desired 4-(2-dimethylaminoethoxy)-phenyl 3-pyridyl ketone by reacting the sodium salt with 2-dimethylaminoethyl chloride.

*Example 3*

A solution of α-picoline lithium in hexane is treated with 4-(2-dimethylaminoethoxy)-phenyl 3-pyridyl ketone according to the procedure of Example 1 to yield the desired 1-[4-(2 - dimethylaminoethoxy)-phenyl]-1-(3-pyridyl)-2-(2-pyridyl)-ethanol, which may be characterized as its maleic acid addition salt.

By utilizing the procedure outline in Example 1 and choosing the appropriate starting materials, the following compounds may be prepared:

1 - (4 - methyl-phenyl) - 1-{4-[2-(1-pyrrolidino)-ethoxy]-phenyl}-2-(2-pyridyl)-ethanol,
1 - phenyl - 1 - [4 - (2-dimethylamino-2-methyl-ethoxy)-phenyl]-2-(2-pyridyl)-ethanol,
1-[4-(2-diethylaminoethoxy) - phenyl] - 1 - (4 - dimethyl-amino-phenyl)-2-(4-pyridyl)-ethanol,
1-[4-(2-diethylaminoethoxy)-phenyl]-1-(4-methoxy-phenyl)-2-(3-pyridazinyl)-ethanol,
1-[4-(2-diethylaminoethyl)-phenyl]-1-(4-chloro-phenyl) - 2-(2-pyrazinyl)-ethanol.

*Example 4*

A mixture of 1-[4-(2-diethylaminoethoxy)-phenyl]-1-(4-methoxy-phenyl)-2-(2-pyridyl)-ethanol, propionic acid anhydride and pyridine yields upon standing at 5° the desired 1-propionyloxy-1-[4-(2-diethylaminoethoxy)-phenyl]-1-(4-methoxy-phenyl)-2-(2-pyridyl)-ethane.

*Example 5*

The 1-[4-(2-diethylaminoethoxy)-phenyl]-1-(4-methoxy-phenyl)-2-(2-pyridyl)-ethanol of Example 1 may also be obtained by treating the 4-(2-diethylaminoethoxy)-phenyl 2-pyridylmethyl ketone with 4-methoxy-phenyl magnesium chloride, decomposing the complex by adding aqueous ammonium chloride and isolating the desired 1 - [4 - (2 - diethylaminoethoxy) - phenyl] - 1 - (4-methoxy-phenyl)-2-(2-pyridyl)-ethanol.

The 4-(2-diethylaminoethoxy)-phenyl 2-pyridylmethyl ketone, used as the starting material in the above reaction may be obtained by reacting a solution of α-picoline lithium in hexane with methyl 4-(2-diethylaminoethoxy)-benzoate.

Any functional groups attached to portions of a resulting compound may be converted into other functional groups: for example, a nitro group may be reduced to an amino group, a nitro or a primary amino group may be reductively alkylated to form secondary or tertiary amino groups, and an amino group may be diazotized and converted to halogen according to the Sandmeyer method, etc.

What is claimed is:

1. A member selected from the group consisting of a compound of the formula:

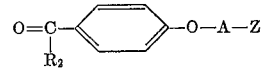

in which $R_2$ stands for pyridyl, A represents alkylene of from two to three carbon atoms, separating the group Z from the oxygen atom by at least two carbon atoms, and Z stands for N,N-di-lower alkyl-amino, and an acid addition salt thereof.

2. 4-(2-dimethylaminoethoxy)-phenyl 2-pyridyl ketone.

References Cited in the file of this patent

UNITED STATES PATENTS

| | | |
|---|---|---|
| 2,585,550 | Hoffmann et al. | Feb. 12, 1952 |
| 2,606,195 | Tilford et al. | Aug. 5, 1952 |
| 2,712,022 | Adamson | June 28, 1955 |
| 2,774,768 | Ehrhart et al. | Dec. 18, 1956 |
| 2,843,520 | Kittila | July 15, 1958 |

UNITED STATES PATENT OFFICE
CERTIFICATE OF CORRECTION

Patent No. 3,007,935              November 7, 1961

William Laszlo Bencze

It is hereby certified that error appears in the above numbered patent requiring correction and that the said Letters Patent should read as corrected below.

Column 3, the last formula at the bottom of the column should appear as shown below instead of as in the patent:

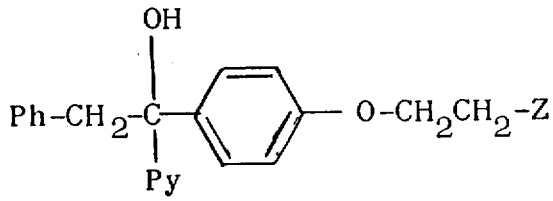

column 4, the first formula at the top of the column should appear as shown below instead of as in the patent:

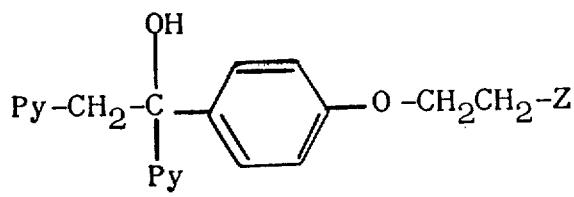

column 8, the formula at the top of the column should appear as shown below instead of as in the patent:

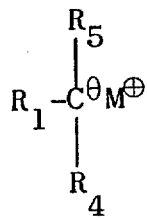

column 10, line 39, for "(2-pyridyl-ethanol" read -- (2-pyridyl)-ethanol --.

Signed and sealed this 28th day of August 1962.

(SEAL)
Attest:

ESTON G. JOHNSON
Attesting Officer

DAVID L. LADD
Commissioner of Patents